May 26, 1931. H. A. CLARK 1,807,569
OIL RETAINER
Filed March 7, 1929
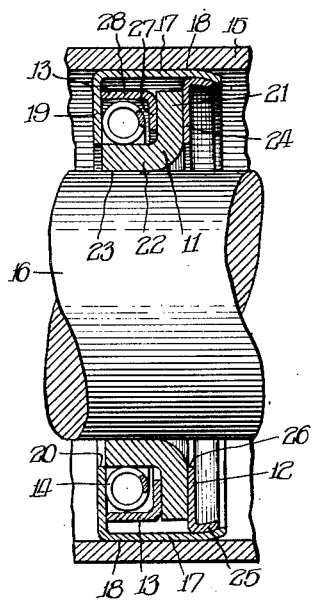
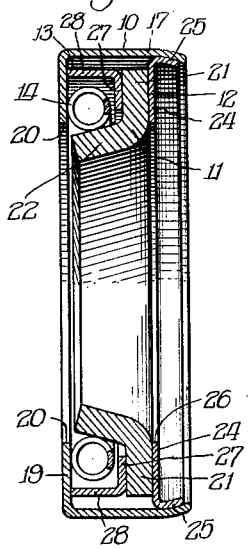
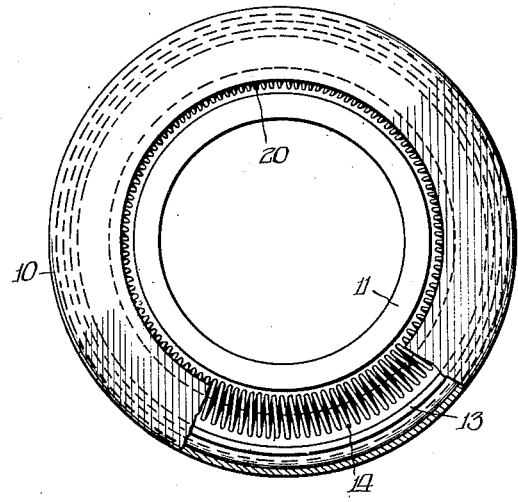
Inventor:
Harold A. Clark, Patented May 26, 1931

1,807,569

UNITED STATES PATENT OFFICE

HAROLD A. CLARK, OF NORTHBROOK, ILLINOIS, ASSIGNOR TO CHICAGO RAWHIDE MANUFACTURING COMPANY, OF CHICAGO, ILLINOIS, A CORPORATION OF ILLINOIS

OIL RETAINER

Application filed March 7, 1929. Serial No. 344,937.

The present invention has to do with oil retainers of the type disclosed in my copending application Serial No. 288,093, and is concerned particularly with certain hereinafter described improvements in the construction of such retainers.

The purpose of the invention is to provide an improved oil retainer of the type referred to which is so constructed as not to become distorted when forced under heavy pressure into a closely fitting tubular member.

Other objects and advantages of the invention will be apparent upon a full understanding of the construction, arrangement and operation of the improved retainer.

One form of the invention is presented herein for the purpose of exemplification, but it will of course be appreciated that the invention is capable of being embodied in other forms coming equally within the scope of the appended claims.

In the accompanying drawings:

Fig. 1 is a diametric section through the retainer, showing the same positioned within a housing about a rotating shaft;

Fig. 2 is another diametric section, showing the retainer before application; and Fig. 3 is an end view, with a portion of the cage broken away to show the interior arrangement.

As will be observed in the drawings, the retainer consists of a cage 10, a packing 11, a washer 12, a spacing ring 13 and a spring 14. The retainer is adapted to be positioned within a housing 15 about a shaft 16 which is substantially concentric with the housing, whereby to provide a fluid-tight closure between the housing and the shaft.

The cage 10 is a cup-shaped sheet metal stamping in which the other parts of the assembly are enclosed. It has a cylindrical rim portion 17 which is in fixed fluid-tight association with the inner wall of the housing at 18, and a bottom portion 19 which is centrally apertured at 20. The aperture 20 is of larger diameter than the shaft 16, and the shaft extends through substantially the center of the same.

The packing 11 is preferably made of leather, and has a flat radially extending portion 21 and a slightly converging axially extending portion 22. The portion 22 is in rotatable fluid-tight association with the shaft at 23 and is distended to a more nearly cylindrical form when in such association.

The washer 12 is a cup-shaped sheet metal stamping which is nested within the open end of the cage 10 and forms an end closure for the same. The washer has a flat bottom portion 24 in spaced relation to the bottom portion 19 of the cage, and has a narrow rim portion 25 which extends in the same direction as the rim portion 17 of the cage in fixed fluid-tight association with the same. The bottom portion 24 of the washer, like the bottom portion of the cage, is provided with an aperture 26 to accommodate the shaft 16. The radially extending portion 21 of the packing is positioned in radially shiftable fluid-tight association with the bottom portion 24 of the washer, and the outside diameter of the portion 21 is less than the inside diameter of the portion 17, whereby to permit the packing to float radially with respect to the cage while continuing in fluid-tight association with the washer.

The spacing ring 13 is a cup-shaped sheet metal stamping which serves to hold the radially extending portion 21 of the packing snugly up against the bottom portion 24 of the washer. The spacing ring has a flat bottom portion 27 which engages with the portion 21 of the packing and a rim portion 28 which engages with the portion 19 of the cage. The outside diameter of the portion 28, like that of the portion 21 of the washer, is less than the inside diameter of the cage, whereby to permit the spacing ring to float radially with the packing within the cage.

The spring 14 extends in an endless tensioned coil about the distended axially extending portion 22 of the packing, within the spacing ring 13, and serves to press the portion 22 of the packing resiliently against the shaft 16.

In order to assemble the parts, the spring, spacing ring and washer are placed in the cage in the arrangement shown, with the radially extending portion 21 of the packing against the bottom portion 27 of the spacing ring, and the washer 12 is then inserted in the open end of the cage with the bottom portion 24 of the washer pressed against the radially extending portion 21 of the packing. While the pressure of the washer against the packing is maintained, the free edge of the rim portion 17 of the cage is spun inwardly, forcing the free edge of the rim portion 25 of the washer inwardly, whereby to fixedly secure the latter in position.

The extended engagement thus produced between the rim of the cage and the rim of the washer insures a permanent unyielding association therebetween, and the inturning of the edges of the rims, and particularly the edge of the rim of the cage, renders one end of the cage slightly cone-shaped and avoids any possibility of any drag which is produced on the rim of the cage in being forced into the housing loosening the connection established between the cage and the washer. The cone-shaping also facilitates insertion of the cage in the housing. By employing a washer which is cup-shaped, and positioning the radially extending portion of the packing against the flat bottom of the washer with such portion set inwardly from the end of the cage, liability of injury to the necessarily flat surface of the washer in engagement with the packing is eliminated.

It will of course be understood that the position of the packing, spacing ring and spring might be reversed in the cage, and the radially extending portion of the packing placed in floating fluid-tight association with the bottom of the cage rather than with the bottom of the washer, without sacrificing certain of the advantages herein described.

I claim:

1. As an article of manufacture, a self-contained seal for insertion as an assembled unit within a cylindrical housing in encompassing relation to a centrally located shaft, consisting of a flat centrally apertured sheet metal cup, an annular packing member positioned in the cup, and a closure member disposed within the rim of the cup; the portion of the periphery of the cup near the bottom of the latter being cylindrical for forced fit engagement with the inner wall of the housing, the portion of the periphery of the cup near the rim of the latter being tapered to interlock axially with the closure member in spaced relation to the inner wall of the housing, and the portion of the periphery of the closure member encircled by the tapered portion of the cup being similarly tapered to interfit therewith.

2. In a seal, a cup-shaped cage adapted to be positioned in a housing with a pressed fit, the periphery of the cage being cylindrical throughout a substantial portion of its length for tightly fitting engagement with the inner wall of the housing and being of reduced diameter for a substantial distance adjacent its rim for clearance from such inner wall, a closure member permanently fastened within the rim of the cage in outwardly non-movable association therewith, and a packing member held under pressure within the cage by the closure member, said closure member being held against outward movement by the reduced portion of said cage.

In witness whereof I have hereunto subscribed my name.

HAROLD A. CLARK.